United States Patent [19]

Rogovin et al.

[11] 4,199,485

[45] Apr. 22, 1980

[54] METHOD OF PRODUCING GRAFT COPOLYMERS OF CELLULOSE WITH VINYLPYRIDINES

[76] Inventors: Zakhar A. Rogovin, Donskaya ulitsa, 24, kv. 68; Boris P. Morin, ulitsa Novatorov, 40, korpus 19, kv. 13; Marina O. Lishevskaya, ulitsa Novatorov, 40, korpus 11, kv. 46, all of Moscow, U.S.S.R.

[21] Appl. No.: 947,844

[22] Filed: Oct. 2, 1978

[30] Foreign Application Priority Data

Feb. 14, 1978 [SU] U.S.S.R. .............................. 2578783[I]

[51] Int. Cl.$^2$ ............................................... C08L 1/02
[52] U.S. Cl. ......................... 260/17.4 GC; 260/17.4 R; 260/17.4 CL; 521/25
[58] Field of Search ................................. 260/17.4 GC

[56] References Cited

U.S. PATENT DOCUMENTS 3,880,736  4/1975  Garnett ......................... 260/17.4 GC

FOREIGN PATENT DOCUMENTS 962028  6/1964  United Kingdom ............ 260/17.4 GC

OTHER PUBLICATIONS

Chem Absts., vol. 82: 87064p, Vinyl Acetate—Ethylene Copolymer Latex, Koshima et al.

*Primary Examiner*—Edward M. Woodberry
*Attorney, Agent, or Firm*—Lackenbach, Lilling & Siegel

[57] ABSTRACT

A method of producing graft copolymers of cellulose with vinylpyridines, residing in free-radical graft copolymerization of cellulose with vinylpyridines from water emulsions in the presence of an emulsifier, namely, partially saponified polyvinylacetate containing 5–15 mass % of acetate groups, and an initiator of a free-radical type. The method makes it possible to perform a free-radical graft copolymerization with a high conversion of monomers (up to 78%) without the formation of free homopolymers.

6 Claims, No Drawings

METHOD OF PRODUCING GRAFT COPOLYMERS OF CELLULOSE WITH VINYLPYRIDINES

FIELD OF APPLICATION OF THE INVENTION

The present invention to methods of producing ion-exchange cellulose fibrous materials and more particularly to methods of producing graft copolymers of cellulose with vinylpyridines. Said graft copolymers containing a pyridine group possess the properties of anionites and are widely used in ion-exchange processes, for example, for catching ions of precious metals, purification of sewage, sugar syrups, etc.

BACKGROUND OF THE INVENTION

It is known that most suitable from the practical standpoint are methods of producing graft copolymers of cellulose with vinyl monomers, in particular, with vinylpyridines, residing in free-radical graft copolymerization of cellulose with vinyl monomers from aqueous solutions or from solutions in organic solvents in the presence of initiators of the free-radical type. The use of organic solvents, however, makes the process of producing graft copolymers of cellulose under industrial conditions extremely complicated and expensive and decreases the yield of the end product and the reaction rate. Graft copolymerization of slightly water-soluble (less than 1%) vinyl monomers, for example, vinylpyridines from water solutions is impractical. Therefore, graft copolymerization of slightly water-soluble vinyl monomers is performed not from solutions but from water emulsions. Thus, for instance, a method is known of producing graft copolymers of cellulose with vinyl monomers, in particular, with vinylpyridines, by way of free-radical graft copolymerization of cellulose with vinyl monomers from water emulsions in the presence of an emulsifier and a free-radical initiator. An emulsifiers use is made of nonionogenic emulsifiers of the type

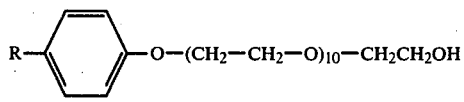

where R=alkyl $C_8$-$C_{10}$, or of ionogenic emulsifiers of the type

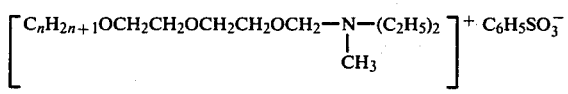

where n=14–17; or of the type

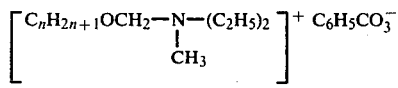

where n=10–16.

The use of said emulsifiers allows an increase of the reation rate and a decrease of the treatment modulus (the term "modulus" is used here to imply the ratio of cellulose mass to that of the liquid phase). In the case of graft copolymerization of vinylpyridines in the presence of said nonionogenic emulsifiers the conversion of monomers is low (25–35%). In the case of graft copolymerization of vinylpyridines in the presence of ionogenic emulsifiers a considerable amount (20–30% as calculated for the monomer conversion) of free homopolymers is formed in the reaction mixture and on the fibers.

BRIEF DESCRIPTION OF THE INVENTION

It is an object of the invention to provide a method of producing graft copolymers of cellulose with vinylpyridines which will make it possible to perform graft copolymerization with a high monomer conversion.

Another object of the invention is to provide a method allowing graft polymerization to be performed without the formation of free homopolymers.

In accordance with these and other objects, the invention resides in the provision of a method of producing graft copolymers of cellulose with vinylpyridines, consisting in a free-radical graft copolymerization of cellulose with vinylpyridines from water emulsions in the presence of an emulsifier and an initiator of a free-radical type. According to the invention, as an emulsifier, use is made of a partially saponified polyvinylacetate containing 5–15 mass % of acetate groups.

The herein-proposed method makes it possible to perform free-radical graft copolymerization with a high conversion (up to 78%) of monomers without the formation of free homopolymers. The emulsifier used in the present method is a readily available, cheap, industrially produced product. The method is technologically simple and can be performed on conventional equipment.

DETAILED DESCRIPTION OF THE INVENTION

In the proposed method cellulose can be used in the form of viscose staple fiber, cotton, or cellulose mass isolated from wood pulp.

The method can be realized on presently existing equipment used for dyeing fibers under pressure.

One of the expedient embodiments of the method is the graft copolymerization in the presence of an of a free-radical initiator of the system $H_2O_2$—$Fe^{2+}$. In this case the method is accomplished in the following way. Cellulose mass (for example, viscose staple fiber) is charged into an apparatus, treated with a 0.1–0.25% aqueous solution of a bivalent iron salt at 15°–25° and a pH of 4.5–5.5 for 10–30 minutes, and washed with desalted water. Then a water emulsion of vinylpyridine is charged into the reactor and graft copolymerization is performed preferably at a temperature of 60°–80° C. and under the conditions of constant circulation of the emulsion through the cellulose mass. The process is run for 1–1.5 hours, after which the spent emulsion is drained from the reactor. The obtained product is washed off from the unreacted monomer with a 1–2% water solution of acetic acid and water, and then discharged and dried.

For a better understanding of the present invention specific examples of realizing thereof are given hereinbelow by way of illustration.

EXAMPLE 1

100 g of viscose staple fiber are treated with a 0.25% water solution of Mohr's salt for 30 minutes at a temperature of 20°–25° C. and a pH of 4.5–5.5, washed with distilled water, pressed out, and placed into a water emulsion of 2-methyl-5-vinylpyridine. The emulsion has the following composition in mass %: 2-methyl-5-vinyl-pyridine, 6; partially saponified polyvinylacetate containing 15 mass % of acetate groups, 0.2; hydrogen peroxide, 0.01; water, 93.79. The treatment modulus (the ratio of the cellulose mass to the liquid phase mass) is 25. The reaction mixture with the fibers is heated up to 80° C. and kept for 120 minutes. The resulting product is washed with water, dried, and the yield of the final product and the amount of free homopolymer are determined.

For comparison, graft copolymerization of 2-methyl-5-vinylpyridine is performed under similar conditions with the use of the known emulsifier, namely, the compound of the above-cited formula II.

The following results are obtained when graft copolymerization is run with the use of the partially saponified polyvinylacetate: the yield of the end product is 218 g (the amount of graft polymer is 118% of the cellulose mass), monomer conversion is 70.5%, the amount of the formed free homopolymer-traces.

When graft polymerization is run with the use of the emulsifier of formula II, the yield of the end product is 179 g (the amount of graft polymer is 79% of the cellulose mass); monomer conversion is 53%, of which 37.5% is for graft copolymerization and 15.5% of homopolymerization; the amount of the formed free homopolymer is 20 g.

EXAMPLE 2

Graft copolymerization of 4-vinylpyridine is run under conditions similar to those described in Example 1, the composition of the water emulsion (in mass %) being as follows: 4-vinyl-pyridine, 8; hydrogen peroxide, 0.02; emulsifier, 0.1; water, 91.88. As the emulsifier use is made of partially saponified polyvinylacetate containing 5 mass % of acetate groups and, for comparison, of the known emulsifier which is a compound of the above-cited formula I.

In the case of graft copolymerization in the presence of partially saponified polyvinylacetate the yield of the end product is 180 g (the amount of graft polymer is 80% of the cellulose mass), monomer conversion is 56%; no free homopolymer is present.

When the known emulsifier of formula I is used in graft copolymerization, the yield of the end product is 135 g (the amount of graft polymer is 35% of the cellulose mass), monomer conversion is 24%; no free homopolymer is present.

EXAMPLE 3

Graft copolymerization of 2-methyl-4-vinylpyridine is run under conditions similar to those described in Example 1, the composition of water emulsion (in mass %) being as follows: 2-methyl-4-vinylpyridine, 7; hydrogen peroxide, 0.02; emulsifier, 0.15; water, 92.83. As an emulsifier use is made of a partially saponificated polyvinylacetate containing 9 mass % of acetate groups and, for comparison, of the known emulsifier which is a compound of the above-cited formula III.

When partially saponified polyvinylacetate is used in graft polymerization, the yeidl of the end product is 187 g (the amount of graft polymer is 87% of the cellulose mass); monomer conversion is 61%; no free homopolymer is present.

In the case of graft copolymerization in the presence of the known emulsifier of formula III, the yield of the end product is 136.7 g (the amount of graft polymer is 36.7% of the cellulose mass); monomer conversion is 45%, of which 36.9% accounts for graft copolymerization and 8.1%, for homopolymerization; the amount of the formed free homopolymer is 11 g.

EXAMPLE 4

100 g of cotton are treated with a 0.2% aqueous solution of sodium hypochlorite at 20° C. for 1 hour, washed with a 0.5% aqueous solution of acetic acid and then with water to neutral reaction. After that the cellulose mass is treated by following the procedure described in Example 1, the only difference being the temperature of graft polymerization equal to 70° C.

The following results are obtained when graft copolymerization is run in the presence of partially saponified polyvinylacetate containing 15 mass % of acetate groups; the yield of the end product is 230 g (the amount of graft polymer is 130% of the cellulose mass); monomer conversion is 77.4%; the amount of free homopolymer-traces.

When the known emulsifier of formula II is used in graft copolymerization, the yield of the end product is 180 g (the amount of graft polymer is 80% of the cellulose mass); monomer conversion is 54%, of which 38% accounts for graft copolymerization and 16%, for homopolymerization; the amount of the formed free homopolymer is 23.7 g.

EXAMPLE 5

Graft copolymerization of 4-vinylpyridine with cellulose mass isolated from wood is run under the conditions similar to those described in Example 4, the only difference being the temperature of the process equal to 60° C. As an emulsifier use is made of partially saponified polyvinylacetate containing 10 mass % of acetate groups; water emulsion used in the process has the following composition (mass %): 4-vinylpyridine, 8; hydrogen peroxide, 0.02; emulsifier, 0.1; water, 91.88.

If partially saponified polyvinylacetate is used in graft copolymerization, the yield of the end product is 160 g (the amount of graft polymer is 60% of the cellulose mass); monomer conversion is 42%; no free homopolymer is present.

The use of the known emulsifier of formula I in graft copolymerization gives 136 g of the end product (the amount of graft polymer is 35% of the cellulose mass); monomer conversion is 25%, without the formation of free homopolymer.

Thus, the proposed method of producing graft copolymers of cellulose with vinylpyridines, in contrast to the known methods, makes it possible to perform the reaction with a high monomer conversion without the formation of homopolymer. This sharply reduces the unproductive consumption of vinylpyridines, eliminates the stages of purification from homopolymer, improves the properties of the obtained end product, simplifies purification of sewage and makes the process more economical.

What is claimed is:
1. In a method of producing graft copolymers of cellulose with vinylpyridine, residing in a free-radical graft copolymerization of cellulose with vinylpyridines from water emulsions in the presence of an emulsifier, the improvement which comprises using as said emulsifier, partially saponified polyvinylacetate, containing

5–15 mass % of acetate groups, and a free radical initiator.

2. The method of claim 1, wherein the free radical initiator is of the system $H_2O_2-Fe^{+2}$.

3. The method of claim 1, wherein the cellulose is selected from the group consisting of viscose staple fiber, cotton, and cellulose mass isolated from wood pulp.

4. The method of claim 1, wherein the graft polymerization is conducted at a temperature of 60°–80° C.

5. The method of claim 1, wherein the vinylpyridine is selected from the group consisting of 2-methyl-5-vinylpyridine, 4-vinylpyridine, and 2-methyl-4-vinylpyridine.

6. The product formed by the method of claim 1.

* * * * *